United States Patent
Wick et al.

(10) Patent No.: US 8,204,503 B1
(45) Date of Patent: Jun. 19, 2012

(54) BASE STATION IDENTIFICATION TO INDICATE MOBILITY OF A WIRELESS COMMUNICATION DEVICE

(75) Inventors: Ryan Alan Wick, Apollo Beach, FL (US); Raymond Emilio Reeves, Olathe, KS (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 110 days.

(21) Appl. No.: 12/862,936

(22) Filed: Aug. 25, 2010

(51) Int. Cl.
*H04W 36/00* (2009.01)

(52) U.S. Cl. ......... 455/436; 455/438; 455/439; 455/440

(58) Field of Classification Search ............... 455/422.1, 455/424, 432.1–432.3, 435.2, 436–444, 101, 455/517; 370/331
See application file for complete search history.

(56) References Cited

U.S. PATENT DOCUMENTS

| | | | |
|---|---|---|---|
| 5,327,144 A | 7/1994 | Stilp et al. | |
| 5,713,073 A * | 1/1998 | Warsta | 455/524 |
| 6,075,458 A | 6/2000 | Ladner et al. | |
| 6,317,604 B1 | 11/2001 | Kovach, Jr. et al. | |
| 6,483,460 B2 | 11/2002 | Stilp et al. | |
| 6,716,101 B1 | 4/2004 | Meadows et al. | |
| 7,113,510 B2 * | 9/2006 | Lin | 370/394 |
| 7,336,964 B2 | 2/2008 | Casey | |
| 7,448,070 B2 * | 11/2008 | Barkley et al. | 726/4 |
| 7,519,050 B2 * | 4/2009 | Thalanany et al. | 370/352 |
| 7,573,846 B2 * | 8/2009 | Rue et al. | 370/329 |
| 2006/0030332 A1 | 2/2006 | Carrott et al. | |
| 2006/0030333 A1 | 2/2006 | Ward et al. | |
| 2006/0059096 A1 | 3/2006 | Dublish et al. | |
| 2006/0271281 A1 | 11/2006 | Ahn et al. | |
| 2007/0013560 A1 | 1/2007 | Casey | |
| 2007/0015519 A1 | 1/2007 | Casey | |
| 2007/0015520 A1 | 1/2007 | Casey | |
| 2007/0061205 A1 | 3/2007 | Crolley | |
| 2007/0067098 A1 | 3/2007 | Zelentsov | |
| 2007/0191006 A1 * | 8/2007 | Carpenter | 455/435.2 |
| 2007/0204163 A1 | 8/2007 | Andrews et al. | |
| 2007/0264969 A1 | 11/2007 | Frank et al. | |
| 2007/0281712 A1 * | 12/2007 | Povey et al. | 455/456.1 |
| 2008/0019317 A1 | 1/2008 | Vellanki et al. | |
| 2008/0049674 A1 * | 2/2008 | Cha et al. | 370/331 |
| 2008/0108319 A1 | 5/2008 | Gallagher | |
| 2008/0189028 A1 | 8/2008 | Nair et al. | |
| 2008/0297365 A1 * | 12/2008 | Welles et al. | 340/670 |
| 2009/0227270 A1 | 9/2009 | Naaman | |
| 2009/0281724 A1 | 11/2009 | Blumenberg et al. | |
| 2010/0097986 A1 * | 4/2010 | Ylitalo et al. | 370/328 |

* cited by examiner

*Primary Examiner* — Dominic E Rego

(57) ABSTRACT

A base station identification system comprises a processing system and a memory device. The processing system is configured to initiate a modulo count to indicate mobility of the wireless communication device, determine a last base station identifier for a last base station serving the wireless communication device, compare the last base station identifier to a set of previous base station identifiers for previous base stations serving the wireless communication device, if the last base station identifier is in the set of previous base station identifiers, assign a previous modulo number in the modulo count to the last base station identifier, and if the last base station identifier is not in the set of previous base station identifiers, assign a next modulo number in the modulo count to the last base station identifier, and add the last base station identifier to the set of previous base station identifiers.

20 Claims, 5 Drawing Sheets

BASE STATION IDENTIFICATION TO INDICATE MOBILITY OF A WIRELESS COMMUNICATION DEVICE

TECHNICAL BACKGROUND

Wireless communication networks typically include wireless communication devices which, via a base station, communicate with further communication networks and equipment. Each wireless communication device typically exchanges communications with a single base station, while multiple wireless communication devices can communicate with the same base station simultaneously. When the wireless communication device is traveling, a handoff from one base station to another may occur.

Typically, a wireless communication device runs several applications that may require general mobility information for the wireless communication device. In some examples, when a wireless communication device moves between base stations, an application that utilizes the global positioning system (GPS) might require a GPS update, but if no handoff has occurred, the wireless communication device may postpone a GPS update to preserve battery power. For example, a weather application could determine that a wireless communication device has relocated based on movement between base stations, and therefore activate GPS to determine a precise location for a weather update. Typically, such applications may attempt to gain access to course location messages (CLM), which provide the latitude and longitude of a serving network sector. The application requesting course location messages can determine that the wireless communication device has moved whenever a CLM indicates a new serving network sector. However, the CLM also exposes the exact location of a network sector to the application.

OVERVIEW

A method of operating a base station identification system to indicate mobility of a wireless communication device comprises initiating a modulo count to indicate the mobility of the wireless communication device, determining a last base station identifier for a last base station serving the wireless communication device, comparing the last base station identifier to a set of previous base station identifiers for previous base stations serving the wireless communication device, and if the last base station identifier is in the set of previous base station identifiers, assigning a previous modulo number in the modulo count to the last base station identifier, wherein the previous modulo number was previously assigned to one of the previous base station identifiers matching the last base station identifier. The method further comprises, if the last base station identifier is not in the set of previous base station identifiers, assigning a next modulo number in the modulo count to the last base station identifier, and adding the last base station identifier to the set of previous base station identifiers. The method further comprises storing data indicating a sequence of the assigned modulo numbers for the modulo count.

A base station identification system to indicate mobility of a wireless communication device comprises a processing system and a memory device. The processing system is configured to initiate a modulo count to indicate the mobility of the wireless communication device, determine a last base station identifier for a last base station serving the wireless communication device, compare the last base station identifier to a set of previous base station identifiers for previous base stations serving the wireless communication device, if the last base station identifier is in the set of previous base station identifiers, assign a previous modulo number in the modulo count to the last base station identifier, wherein the previous modulo number was previously assigned to one of the previous base station identifiers matching the last base station identifier, and if the last base station identifier is not in the set of previous base station identifiers, assign a next modulo number in the modulo count to the last base station identifier, and add the last base station identifier to the set of previous base station identifiers. The memory device is configured to store data indicating a sequence of the assigned modulo numbers for the modulo count.

A method of operating a base station identification system to indicate mobility of a wireless communication device comprises initiating a modulo count to indicate the mobility of the wireless communication device, determining a last base station identifier for a last base station serving the wireless communication device, comparing the last base station identifier to a set of previous base station identifiers for previous base stations serving the wireless communication device, and if the last base station identifier is in the set of previous base station identifiers, assigning a previous modulo number in the modulo count to the last base station identifier, wherein the previous modulo number was previously assigned to one of the previous base station identifiers matching the last base station identifier, and transferring the previous modulo number for delivery to the wireless communication device when a handoff to the last base station serving the wireless communication device occurs. The method further comprises, if the last base station identifier is not in the set of previous base station identifiers, assigning a next modulo number in the modulo count to the last base station identifier, adding the last base station identifier to the set of previous base station identifiers, and transferring the next modulo number for delivery to the wireless communication device when a handoff to the last base station serving the wireless communication device occurs.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
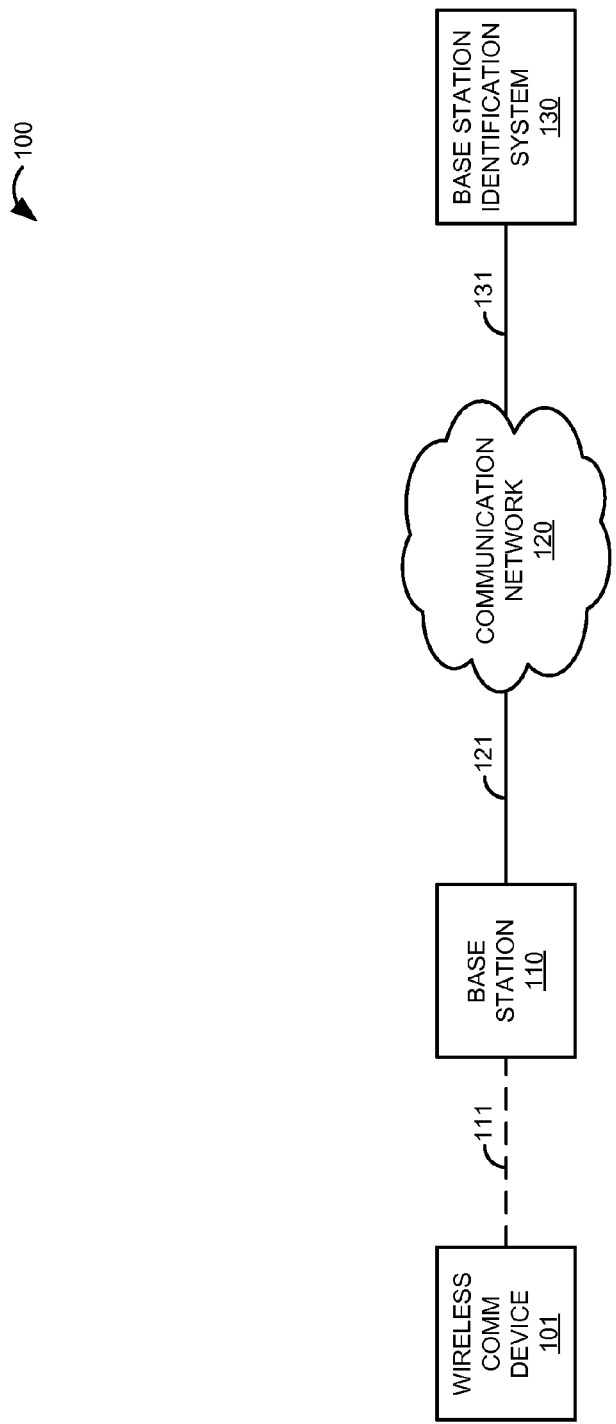
FIG. 1 is a block diagram that illustrates a communication system.

FIG. 1 is a block diagram that illustrates communication system 100. Communication system 100 includes wireless communication device 101, base station 110, communication network 120, and base station identification system 130. Wireless communication device 101 is in communication with base station 110 over wireless communication link 111. Base station 110 communicates with communication network 120 over communication link 121. Base station identification system 130 is in communication with communication network 120 over communication link 131.

Figure 2:
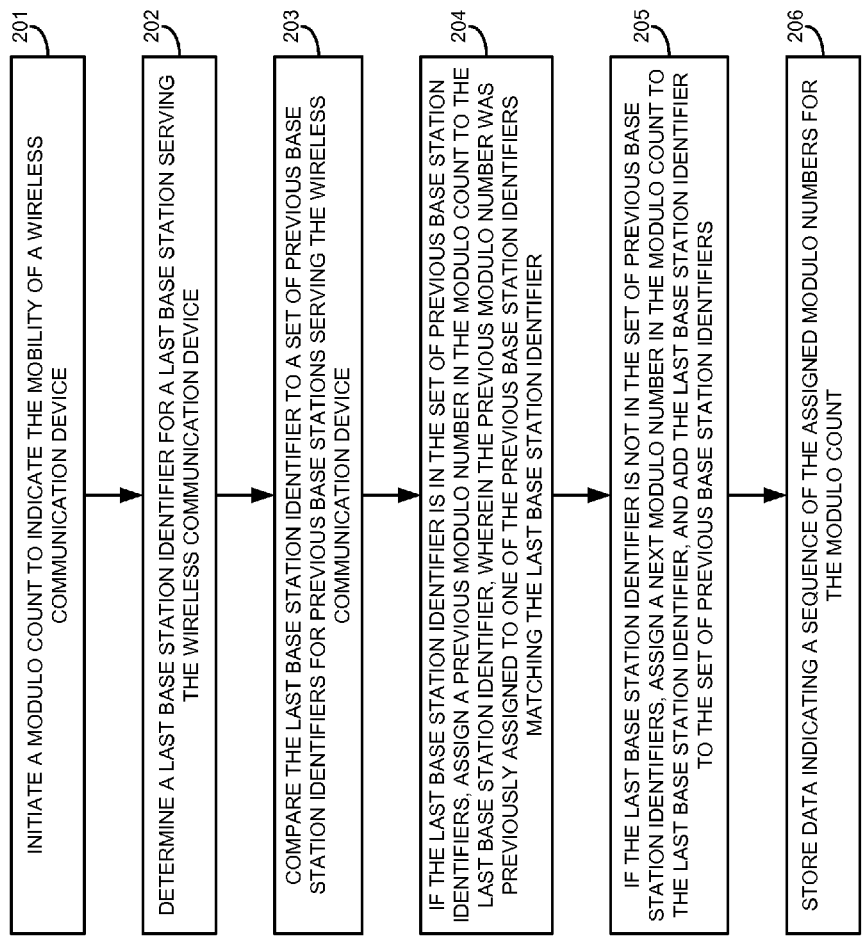
FIG. 2 is a flow diagram that illustrates an operation of the communication system.

FIG. 2 is a flow diagram that illustrates an operation of communication system 100. The steps of the operation are indicated below parenthetically. The exemplary operation shown in FIG. 2 depicts a method of operating base station identification system 130 to indicate mobility of wireless communication device 101.

To begin, base station identification system 130 initiates a modulo count to indicate the mobility of wireless communication device 101 (201). Base station identification system 130 could initiate the modulo count at any time, but the count is typically initiated when wireless communication device 101 first registers with communication network 120, or upon an initial request transmitted from wireless communication device 101 for mobility information.

The modulo count typically comprises a repetitive number sequence. Thus, in some examples base station identification system 130 could initiate the modulo count by defining the repetitive number sequence for the modulo count. Typically, the number sequence of the modulo count is ordered from lowest value to highest value, and when counting up from lowest to highest, the sequence returns to the lowest value after reaching the highest value. For example, base station identification system 130 could initiate the modulo count to a repeating sequence of the integers 0-99, so when counting up and 99 is reached, the sequence loops back around to 0 for the next number and repeats counting up to 99 again. Although the size of the number sequence in the modulo count could be any size, including limitless, the size of the modulo count typically has a direct relationship to the size of communication network 120, the number of base stations associated with communication network 120, and/or the number of users, groups, or devices utilizing communication network 120.

Referring again to FIG. 2, base station identification system 130 determines a last base station identifier for a last base station 110 serving wireless communication device 101 (202). In this example, base station identification system 130 identifies base station 110 as the last base station 110 serving wireless communication device 101 because base station 110 is the most recent base station to serve wireless communication device 101, whether or not any other base stations were previously serving device 101. The last base station identifier for the last base station 110 serving wireless communication device 101 could comprise any information that uniquely identifies base station 110, a sector of base station 110, a communication network 120 associated with base station 110, or any other aspect associated with base station 110. In some examples, the last base station identifier could indicate a sector of the last base station 110 serving wireless communication device 101. Additionally or alternatively, in some examples the last base station identifier could comprise a system identification number (SID) and a network identification number (NID) associated with a sector of base station 110.

Base station identification system 130 compares the last base station identifier to a set of previous base station identifiers for previous base stations serving wireless communication device 101 (203). Thus, base station identification system 130 typically maintains a list of previous base station identifiers in a database or some other storage system. In some examples, base station identification system 130 compares the last base station identifier to the set of previous base station identifiers for previous base stations serving wireless communication device 101 to determine whether or not the last base station identifier is included in the set of previous base station identifiers.

If the last base station identifier is in the set of previous base station identifiers, base station identification system 130 assigns a previous modulo number in the modulo count to the last base station identifier (204). The previous modulo number was previously assigned to one of the previous base station identifiers matching the last base station identifier (204). For example, if the previous modulo number "5" was previously assigned to the last base station identifier, then base station identification system 130 assigns the previous modulo number "5" to the last base station identifier. In some examples, base station identification system 130 could assign the previous modulo number in the modulo count to the last base station identifier by assigning the previous modulo number and a repeat number indicator to the last base station identifier, and the repeat number indicator could indicate that the previous modulo number was already assigned to the last base station identifier. Base station identification system 130 may additionally transfer the previous modulo number and the repeat number indicator for delivery to wireless communication device 101 when a handoff to the last base station 110 serving the wireless communication device 101 occurs.

However, if the last base station identifier is not in the set of previous base station identifiers, base station identification system 130 assigns a next modulo number in the modulo count to the last base station identifier and adds the last base station identifier to the set of previous base station identifiers (205). For example, if last base station identifier is not included in the set of previous base station identifiers, then the next modulo number in the modulo count is newly assigned to the last base station identifier, and the last base station identifier is added to the set of previous base station identifiers. Base station identification system 130 typically associates the next modulo number with the last base station identifier when adding the last base station identifier to the set of previous base station identifiers. In some examples, base station identification system 130 could assign the next modulo number in the modulo count to the last base station identifier by assigning the next modulo number and a new number indicator to the last base station identifier, and the new number indicator could indicate that the next modulo number is newly assigned to the last base station identifier. In some examples, base station identification system 130 may additionally transfer the next modulo number and the new number indicator for delivery to wireless communication device 101 when a handoff to the last base station 110 serving the wireless communication device 101 occurs.

When base station identification system 130 assigns the next modulo number in the modulo count to the last base station identifier, the next modulo number in the modulo count could either be previously unassigned or assigned to a different base station identifier in the set of previous base station identifiers. Therefore, in some examples, if the next modulo number was already assigned to a previous base station identifier in the set of previous base station identifiers, base station identification system 130 unassigns the next modulo number from the previous base station identifier and removes the previous base station identifier from the set of previous base station identifiers. In this manner, when base station identification system 130 next determines that wireless communication device 101 is served by the base station formerly assigned the previous base station identifier, its base station identifier was removed and thus is not in the set of previous base station identifiers, so base station identification system 130 will assign a next modulo number in the modulo count to this base station.

At any time before, during, or after the above operational steps 201-205, base station system 130 may store data indicating a sequence of the assigned modulo numbers for the modulo count (206). Base station identification system 130 could store the data indicating the sequence of the assigned modulo numbers in a database, memory device, or any data storage system internal and/or external to system 130. In some examples, base station identification system 130 processes the sequence of the assigned modulo numbers for the modulo count to assign the previous modulo number in the modulo count to the last base station identifier. In addition, as discussed above, base station identification system 130 could transfer the assigned modulo number for delivery to wireless communication device 101 when a handoff to the last base station 110 serving the wireless communication device 101 occurs.

The above operation describes how base station identification system 130 determines a last base station identifier for a last base station serving wireless communication device 101 and assigns a modulo number in a modulo count to the last base station identifier. In this manner, the base station identifier can be masked by the assigned modulo number. Advantageously, base station identification system 130 can transfer the assigned modulo number for delivery to wireless communication device 101 when a handoff to the last base station 110 serving the wireless communication device 101 occurs to indicate mobility of device 101, without providing the actual base station identifier or other information about base station system 110. An application running on wireless communication device 101 that requests mobility information for device 101 will only receive the assigned modulo numbers for base stations serving wireless communication device 101, thereby preserving the privacy of the user of device 101 and the network infrastructure of communication network 120.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and base station 110.

Base station 110 comprises RF communication circuitry and an antenna. The RF communication circuitry typically includes an amplifier, filter, RF modulator, and signal processing circuitry. Base station 110 may also comprise a router, server, memory device, software, processing circuitry, cabling, power supply, network communication interface, structural support, or some other communication apparatus. Base station 110 could comprise a wireless access node, Internet access node, telephony service node, wireless data access point, or some other wireless communication system—including combinations thereof. Some examples of base station 110 include a base transceiver station (BTS), base station controller (BSC), radio base station (RBS), Node B, enhanced Node B (eNode B), and others. Wireless network protocols that may be utilized by base station 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Base station identification system 130 comprises a computer system and communication interface. Base station identification system 130 may also include other components such as a router, server, data storage system, and power supply. Base station identification system 130 may reside in a single device or may be distributed across multiple devices. Base station identification system 130 may be a discrete system or may be integrated within other systems—including other systems within communication system 100. Base station identification system 130 could comprise a packet gateway, mobile switching center, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
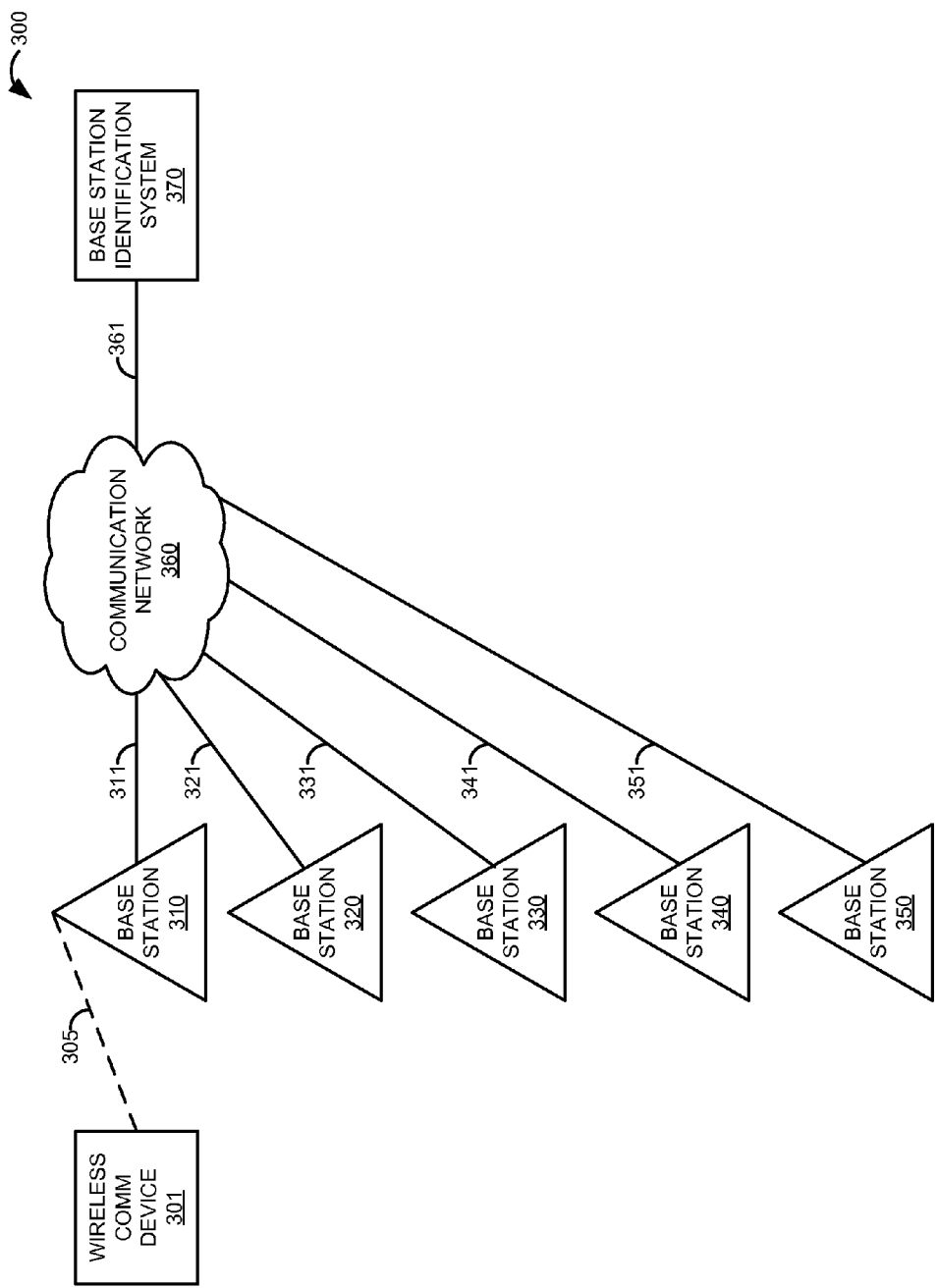
FIG. 3 is a block diagram that illustrates a communication system in an exemplary embodiment.

FIG. 3 is a block diagram that illustrates communication system 300. Communication system 300 includes wireless communication device 301, base stations 310-350, communication network 360, and base station identification system 370. Although FIG. 3 shows wireless communication device 301 in communication with base station 310 over wireless communication link 305, wireless communication device 301 can also communicate with base stations 320-350 over similar wireless links (not shown). Base stations 310, 320, 330, 340, and 350 communicate with communication network 360 over respective communication links 311, 321, 331, 341, and 351. Base station identification system 370 is in communication with communication network 360 over communication link 361.

Figure 4:
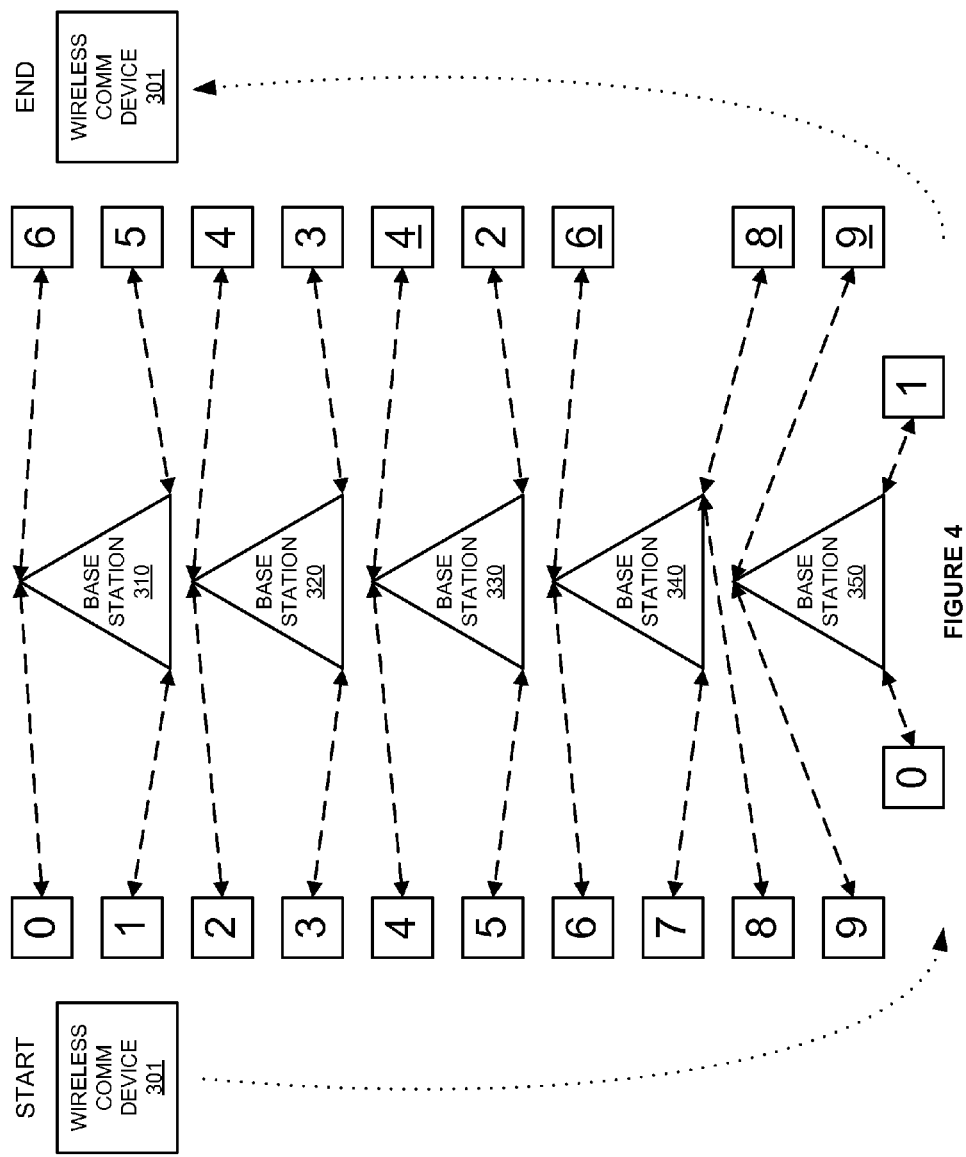
FIG. 4 is a block diagram that illustrates an operation of the communication system in an exemplary embodiment.

FIG. 4 is a block diagram that illustrates an operation of communication system 300 in an exemplary embodiment. In this example, wireless communication device 301 is moving in a U-shaped pattern around base stations 310-350, starting at the top left and ending at the top right side of FIG. 4. For exemplary purposes, each base station 310-350 is shown on FIG. 4 as a triangle, where each point of each triangle represents a sector of a respective base station 310-350. As wireless communication device 301 travels around the base stations 310-350, several handoffs occur between the sectors of the base stations 310-350. When these handoffs occur, base station identification system 370 determines a modulo number for the sector and transfers the modulo number for delivery to wireless communication device 301. However, note that in other examples, base station identification system 370 does not transfer modulo numbers for delivery to wireless communication device 301, but instead simply stores data indicating a sequence of assigned modulo numbers for a modulo count. Further, base station identification system 370 could store sequences of assigned modulo numbers for a plurality of modulo counts for a plurality of respective wireless communication devices, thereby generating anonymous mobility data with respect to the users and their devices, the base stations serving those devices, and the locations of the serving base stations.

Typically, the modulo count might be set to a repetitive sequence of 0-99, but in this example, base station identification system 370 initiates the modulo count to the integers 0-9 for clarity. At the start of FIG. 4, wireless communication device 301 is running an application which has requested a notification from base station identification system 370 when a change in sectors occurs. For example, the application running on wireless communication device 301 could use a Java Application Programming Interface (API) to request notifications of a change in sectors and receive the notifications through an EventListener interface. Thus, the numbers in the boxes shown on FIG. 4 represent the modulo numbers that base station identification system 370 transfers to wireless communication device 301 when device 301 changes sectors after a handoff. If the number is underlined, the number is a repeat value, meaning that the number was already assigned to the corresponding sector and wireless communication device 301 has visited the repeat sector at least once before. Thus, an underlined number provides a repeat number indicator to the EventListener to inform the application that wireless communication device 301 was previously served by this sector having the underlined number. However, the number is not underlined if the number is a new modulo number, meaning newly assigned to the corresponding sector. For example, to provide a new number indicator, the number is not underlined if the sector either had no previously assigned value or had a different number previously assigned.

In this example, the modulo count starts at zero, which is the first modulo number in the modulo count. In some examples, the modulo count is reset to this first modulo number of the modulo count whenever wireless communication device 301 is first powered on, or first registers with communication network 360. In other examples, a user of communication device 301 or an application running on device 301 could perform an explicit reset of the modulo count to the first modulo number through a protected API. A communication service provider that operates communication network 360 could also reset the modulo count for wireless communication device 301 at any time. For example, operators of communication network 360 could reset the modulo count when wireless communication device 301 relocates to a new geographic area that is a far distance away from a previous geographic area where device 301 was formerly operating.

Referring now to FIG. 4, wireless communication device 301 is first connected to a first sector of base station 310 assigned modulo number 0. The number is not underlined to provide a new number indicator, meaning this is either the first time that device 301 has been served by this sector, or the sector was previously assigned a different modulo number.

Continuing down, the EventListener next receives a modulo number 1 when device 301 is served by a second sector of base station 310, modulo numbers 2 and 3 when device 301 is served by two respective sectors of base station 320, and modulo numbers 4 and 5 when device 301 is served by two respective sectors of base station 330. Base station identification system 370 next transfers modulo numbers 6, 7, and 8 when device 301 is served by three respective sectors of base station 340. Finally, when device 301 is served by a first sector of base station 350, modulo number 9 is assigned to this sector and transferred to device 301. Note that all of the above numbers 1-9 are not underlined to indicate that these are new modulo number assignments for these sectors.

As wireless communication device 301 curves east and travels below base station 350, device 301 is served by a second sector of base station 350. At this time, all of the modulo numbers 0-9 in the modulo count have been assigned to their respective sectors, so the modulo count loops back around. Therefore, modulo number 0 is the next number in the modulo count and is assigned to the second sector of base station 350. The newly assigned sector 0 is not underlined to indicate that 0 is a new modulo number assignment for this sector. Based on the new number indicator, the application running on wireless communication device 301 could determine that any information previously associated with the "old" sector 0 is unrelated to this "new" sector 0.

Likewise, base station identification system 370 assigns modulo number 1 to the third sector of base station 350, since 1 is the next number in the modulo count and the third sector of base station 350 had no previously assigned value. When base station identification system 370 assigns modulo number 1 to the third sector of base station 350, identification system 370 typically removes the previous assignment of modulo number 1 from the second sector of base station 310.

As wireless communication device 301 curves north and travels up the right-hand side of base stations 310-350, device 301 is again served by the first sector of base station 350 that was previously assigned modulo number 9. Since no intervening sectors have been assigned a new modulo number 9, the first sector of base station 350 is still assigned modulo number 9. Thus, base station identification system 370 transfers modulo number 9 to wireless communication device 301 when device 301 is again served by the first sector of base station 350. In FIG. 4, modulo number 9 is underlined to provide a repeat number indicator, which informs the application running on wireless communication device 301 that device 301 was previously served by this same sector the last time modulo number 9 was received by the EventListener.

Likewise, wireless communication device re-visits the third and first sectors of base station 340 having previously assigned modulo numbers 8 and 6, respectively. Thus, the numbers 8 and 6 are underlined in FIG. 4 to show that repeat number indicators are provided for these sectors.

Next, wireless communication device 301 is served by a previously unvisited third sector of base station 330. Base station identification system 370 therefore assigns the next number in the modulo count to this sector, which is modulo number 2. Modulo number 2 is not underlined to show that this is a new value for this sector, which indicates that device 301 is currently served by a "new" sector 2 that is unrelated to the previous sector having modulo number 2.

Wireless communication device 301 then travels up to the first sector of base station 330 that was previously assigned modulo number 4. Since modulo number 4 was previously assigned to this sector, and no sectors visited by device 301 thereafter have been assigned modulo number 4 as a new value, base station identification system 370 retains the assignment of the previous modulo number 4 with this sector. The number 4 is shown underlined in FIG. 4 to provide the repeat number indicator, which indicates that the previous visit to this sector was associated with modulo number 4. Thus, an application running on wireless communication device 301 could determine that device 301 is now being served by the same sector of base station 330 as when modulo number 4 was previously assigned.

Continuing upward, wireless communication device 301 travels into an area served by a previously unvisited third sector of base station 320. Since no modulo number has been previously assigned to this sector, base station system 370 assigns modulo number 3, which is the next number in the modulo count. The number 3 is shown without an underline on FIG. 4 to indicate that this is a new value. Note that the previous sector assigned modulo number 3, which incidentally is the second sector of this same base station 320, is unassigned from modulo number 3 at this time. Thus, if wireless communication device 301 were to visit the "old" sector 3 at a future time (not shown), it would receive a new modulo number provided by the next number in the modulo count.

Referring again to FIG. 4, wireless communication device 301 travels north to a first sector of base station 320, assigned modulo number 2 on a previous visit. However, when wireless communication device 301 was served by the third sector of base station 330, this intervening sector was assigned modulo number 2. When the third sector of base station 330 was assigned modulo number 2, the previous association between the first sector of base station 320 and modulo number 2 was removed and replaced by the new assignment. Thus, base station identification system 370 assigns a next modulo number in the modulo count to the sector, which is modulo number 4 in this example. The number 4 assigned to the first sector of base station 320 is shown without underlining to indicate that this is a new number. Note that the assignment of modulo number 4 to the first sector of base station 320 breaks the previous assignment of modulo number 4 to the first sector of base station 330.

Wireless communication device 301 continues north to a previously unvisited third sector of base station 310. This sector is therefore assigned the next number in the modulo count, which is modulo number 5. The number 5 is not underlined to show that 5 is a new value assigned to this sector.

Finally, wireless communication device 301 travels up to the first sector of base station 310, which was previously assigned modulo number 0 at the start of this example. However, when wireless communication device 301 was served by the second sector of base station 350, a new modulo number was required, and the next modulo number in the modulo count was 0. Thus, modulo number 0 was assigned to that sector, and unassigned from the first sector of base station 310. Now, when wireless communication device 301 revisits the first sector of base station 310, base station identification system 310 assigns a new number for the sector from the next modulo number in the modulo count, which is modulo number 6. Again, the previous assignment of modulo number 6 to the first sector of base station 340 is removed.

In some examples, the internal tracking of modulo number to sector assignments could be implemented by mapping the system identification number (SID) and network identification number (NID) of a sector to the assigned modulo number. For example, base station identification system 370 could use these mappings to determine whether a modulo number was previously assigned to a sector. In this manner, base station identification system 370 can provide the assigned modulo number and a "new" or "repeat" number indicator when an application on wireless communication device 301 requests mobility information for device 301. Advantageously, the actual SID/NID values of each sector are hidden from the application by the API, thereby preserving the privacy of the user of device 301 and preventing the application from potentially mapping the locations of base stations 310-350.

Figure 5:
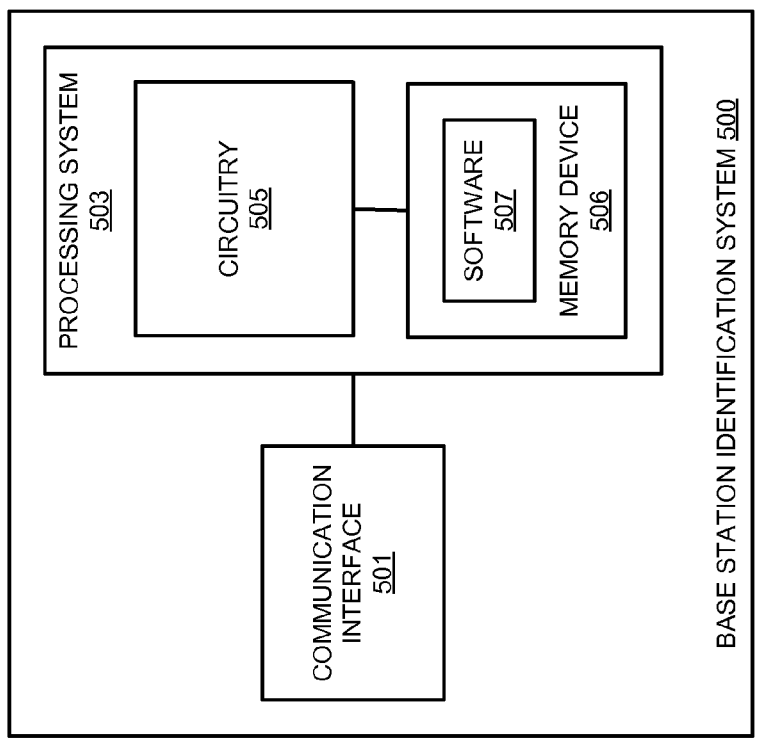
FIG. 5 is a block diagram that illustrates a base station identification system.

FIG. 5 is a block diagram that illustrates base station identification system 500. Base station identification system 500 provides an example of base station identification systems 130 and 370, although systems 130 and 370 may use alternative configurations. Base station identification system 500 comprises communication interface 501 and processing system 503. Processing system 503 is linked to communication interface 501. Processing system 503 includes processing circuitry 505 and memory device 506 that stores operating software 507.

Communication interface 501 comprises components that communicate over communication links, such as network cards, ports, RF transceivers, processing circuitry and software, or some other communication components. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 could be configured to transfer a modulo number for delivery to a wireless communication device.

Processing circuitry 505 comprises microprocessor and other circuitry that retrieves and executes operating software 507 from memory device 506. Memory device 506 comprises a disk drive, flash drive, data storage circuitry, or some other memory apparatus. In some examples, memory device 506 may be configured to store data indicating a sequence of assigned modulo numbers for a modulo count. Operating software 507 comprises computer programs, firmware, or some other form of machine-readable processing instructions. Operating software 507 may include an operating system, utilities, drivers, network interfaces, applications, or some other type of software.

When executed by circuitry 505, operating software 507 directs processing system 503 to operate as described herein for base station identification systems 130 and 370. In particular, operating software 507 directs processing system 503 to initiate a modulo count to indicate the mobility of a wireless communication device, determine a last base station identifier for a last base station serving the wireless communication device, compare the last base station identifier to a set of previous base station identifiers for previous base stations serving the wireless communication device, if the last base station identifier is in the set of previous base station identifiers, assign a previous modulo number in the modulo count to the last base station identifier, wherein the previous modulo number was previously assigned to one of the previous base station identifiers matching the last base station identifier, and if the last base station identifier is not in the set of previous base station identifiers, assign a next modulo number in the modulo count to the last base station identifier and add the last base station identifier to the set of previous base station identifiers. In some examples, operating software 507 could comprise a count initiation module that initiates a modulo count to indicate the mobility of a wireless communication device, a base station identification module that determines a last base station identifier for a last base station serving the wireless communication device, a comparison module that compares the last base station identifier to a set of previous base station identifiers for previous base stations serving the wireless communication device, an assignment module that assigns a previous modulo number in the modulo count to the last base station identifier if the last base station identifier is in the set of previous base station identifiers, but if the last base station identifier is not in the set of previous base station identifiers, the assignment module assigns a next modulo number in the modulo count to the last base station identifier and adds the last base station identifier to the set of previous base station identifiers, and a storage module that stores data indicating a sequence of the assigned modulo numbers for the modulo count.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a base station identification system to indicate mobility of a wireless communication device, the method comprising:

initiating a modulo count to indicate the mobility of the wireless communication device;
   determining a last base station identifier for a last base station serving the wireless communication device;
   comparing the last base station identifier to a set of previous base station identifiers for previous base stations serving the wireless communication device;
   if the last base station identifier is in the set of previous base station identifiers, assigning a previous modulo number in the modulo count to the last base station identifier, wherein the previous modulo number was previously assigned to one of the previous base station identifiers matching the last base station identifier;
   if the last base station identifier is not in the set of previous base station identifiers, assigning a next modulo number in the modulo count to the last base station identifier, and adding the last base station identifier to the set of previous base station identifiers; and
   storing data indicating a sequence of the assigned modulo numbers for the modulo count.

2. The method of claim 1 wherein the last base station identifier indicates a sector of the last base station serving the wireless communication device.

3. The method of claim 1 wherein the last base station identifier comprises a system identification number (SID) and a network identification number (NID).

4. The method of claim 1 wherein assigning the previous modulo number in the modulo count to the last base station identifier comprises assigning the previous modulo number and a repeat number indicator to the last base station identifier.

5. The method of claim 4 wherein the repeat number indicator indicates that the previous modulo number was already assigned to the last base station identifier.

6. The method of claim 1 wherein assigning the next modulo number in the modulo count to the last base station identifier comprises assigning the next modulo number and a new number indicator to the last base station identifier.

7. The method of claim 6 wherein the new number indicator indicates that the next modulo number is newly assigned to the last base station identifier.

8. The method of claim 1 further comprising, if the last base station identifier is in the set of previous base station identifiers, transferring the previous modulo number for delivery to the wireless communication device when a handoff to the last base station serving the wireless communication device occurs.

9. The method of claim 1 further comprising, if the last base station identifier is not in the set of previous base station identifiers, transferring the next modulo number for delivery to the wireless communication device when a handoff to the last base station serving the wireless communication device occurs.

10. The method of claim 1 wherein assigning the next modulo number in the modulo count to the last base station identifier comprises, if the next modulo number was already assigned to one of the previous base station identifiers in the set of previous base station identifiers, unassigning the next modulo number from the one of the previous base station identifiers and removing the one of the previous base station identifiers from the set of previous base station identifiers.

11. A base station identification system to indicate mobility of a wireless communication device, the system comprising:

a processing system configured to initiate a modulo count to indicate the mobility of the wireless communication device, determine a last base station identifier for a last base station serving the wireless communication device, compare the last base station identifier to a set of previous base station identifiers for previous base stations serving the wireless communication device, if the last base station identifier is in the set of previous base station identifiers, assign a previous modulo number in the modulo count to the last base station identifier, wherein the previous modulo number was previously assigned to one of the previous base station identifiers matching the last base station identifier, and if the last base station identifier is not in the set of previous base station identifiers, assign a next modulo number in the modulo count to the last base station identifier, and add the last base station identifier to the set of previous base station identifiers; and a memory device configured to store data indicating a sequence of the assigned modulo numbers for the modulo count.

12. The system of claim 11 wherein the last base station identifier indicates a sector of the last base station serving the wireless communication device.

13. The system of claim 11 wherein the last base station identifier comprises a system identification number (SID) and a network identification number (NID).

14. The system of claim 11 wherein the processing system configured to assign the previous modulo number in the modulo count to the last base station identifier comprises the processing system configured to assign the previous modulo number and a repeat number indicator to the last base station identifier.

15. The system of claim 14 wherein the repeat number indicator indicates that the previous modulo number was already assigned to the last base station identifier.

16. The system of claim 11 wherein the processing system configured to assign the next modulo number in the modulo count to the last base station identifier comprises the processing system configured to assign the next modulo number and a new number indicator to the last base station identifier.

17. The system of claim 16 wherein the new number indicator indicates that the next modulo number is newly assigned to the last base station identifier.

18. The system of claim 11 further comprising a communication interface configured to, if the last base station identifier is in the set of previous base station identifiers, transfer the previous modulo number for delivery to the wireless communication device when a handoff to the last base station serving the wireless communication device occurs.

19. The system of claim 11 further comprising a communication interface configured to, if the last base station identifier is not in the set of previous base station identifiers, transfer the next modulo number for delivery to the wireless communication device when a handoff to the last base station serving the wireless communication device occurs.

20. A method of operating a base station identification system to indicate mobility of a wireless communication device, the method comprising:

initiating a modulo count to indicate the mobility of the wireless communication device;

determining a last base station identifier for a last base station serving the wireless communication device;

comparing the last base station identifier to a set of previous base station identifiers for previous base stations serving the wireless communication device;

if the last base station identifier is in the set of previous base station identifiers, assigning a previous modulo number in the modulo count to the last base station identifier, wherein the previous modulo number was previously assigned to one of the previous base station identifiers matching the last base station identifier, and transferring the previous modulo number for delivery to the wireless communication device when a handoff to the last base station serving the wireless communication device occurs; and if the last base station identifier is not in the set of previous base station identifiers, assigning a next modulo number in the modulo count to the last base station identifier, adding the last base station identifier to the set of previous base station identifiers, and transferring the next modulo number for delivery to the wireless communication device when a handoff to the last base station serving the wireless communication device occurs.

* * * * *